United States Patent [19]
Dent

[11] Patent Number: 5,862,173
[45] Date of Patent: Jan. 19, 1999

[54] RE-ORTHOGONALIZATION OF WIDEBAND CDMA SIGNALS

[75] Inventor: Paul W. Dent, Prästgård, Sweden

[73] Assignee: Ericsson Inc., Research Triangle Park, N.C.

[21] Appl. No.: 570,431

[22] Filed: Dec. 11, 1995

[51] Int. Cl.$^6$ .................................................. H04K 1/00
[52] U.S. Cl. ............................................................ 375/206
[58] Field of Search .................................... 375/200, 206, 375/208; 370/342

[56] References Cited

U.S. PATENT DOCUMENTS

| 5,105,435 | 4/1992 | Stilwell | 375/1 |
| 5,151,919 | 9/1992 | Dent | 375/1 |
| 5,218,619 | 6/1993 | Dent | 375/1 |
| 5,224,122 | 6/1993 | Bruckert | 375/200 |
| 5,241,702 | 8/1993 | Dent | 455/278.1 |
| 5,295,152 | 3/1994 | Gudmudson et al. | 375/200 |
| 5,323,418 | 6/1994 | Ayerst et al. | 375/1 |
| 5,325,394 | 6/1994 | Bruckert | 375/200 |
| 5,353,352 | 10/1994 | Dent et al. | 380/37 |
| 5,414,728 | 5/1995 | Zehavi | 375/200 |
| 5,467,367 | 11/1995 | Izumi et al. | 375/206 |
| 5,490,165 | 2/1996 | Blakeney, II et al. | 375/208 |
| 5,546,424 | 8/1996 | Miyake | 375/206 |
| 5,553,062 | 9/1996 | Schilling et al. | 375/207 |

FOREIGN PATENT DOCUMENTS

526439  2/1993  European Pat. Off. .

Primary Examiner—Tesfaldet Bocure
Attorney, Agent, or Firm—Burns, Doane, Swecker & Mathis, L.L.P.

[57] ABSTRACT

A method and receiver which provides, among other features, for resubtraction of an already subtracted signal in order to eliminate subtraction errors, termed re-orthogonalization, is described herein. According to exemplary embodiments, pairwise combinations of spreading codes are used to despread received composite signals. For example, these pairwise combinations can include a first spreading code associated with a signal that has already been subtracted and a second spreading code associated with a signal which is weaker than that associated with the first spreading code. In this way both resubtraction and subtraction are performed at the same time.

65 Claims, 6 Drawing Sheets

RE-ORTHOGONALIZATION OF WIDEBAND CDMA SIGNALS

BACKGROUND

The present invention relates generally to radiocommunication systems and, more particularly, to signal processing techniques in spread spectrum radiocommunication systems.

CDMA and spread spectrum communications have been around since the days of World War II. Early applications were predominantly military oriented. However, today there has been an increasing interest in using spread spectrum systems in commercial applications, including digital cellular radio, land mobile radio, and indoor and outdoor personal communication networks.

The cellular telephone industry has made phenomenal strides in commercial operations in the United States as well as the rest of the world. Growth in major metropolitan areas has far exceeded expectations and is outstripping system capacity. If this trend continues, the effects of rapid growth will soon reach even the smallest markets. Innovative solutions are required to meet these increasing capacity needs as well as maintain high quality service and avoid rising prices.

Throughout the world, one important step in cellular systems is to change from analog to digital transmission. Equally important is the choice of an effective digital transmission scheme for implementing the next generation cellular technology. Furthermore, it is widely believed that the first generation of Personal Communication Networks (PCNs), employing low cost, pocket-size, cordless telephones that can be carried comfortably and used to make or receive calls in the home, office, street, car, etc., will be provided by cellular carriers using the next generation digital cellular system infrastructure. The key feature demanded in these new systems is increased traffic capacity.

Currently, channel access is achieved using Frequency Division Multiple Access (FDMA) and Time Division Multiple Access (TDMA) methods. In FDMA, a communication channel is a single radio frequency band into which a signal's transmission power is concentrated. System capacity is limited by the available frequencies as well as by limitations imposed by channel reuse. In TDMA systems, a channel consists of a time slot in a periodic train of time intervals over the same frequency. System capacity is limited by the available time slots as well as by limitations imposed on channel reuse.

With FDMA or TDMA or hybrid FDMA/TDMA systems, the goal is to ensure that two potentially interfering signals do not occupy the same frequency at the same time. In contrast, Code Division Multiple Access (CDMA) allows signals to overlap in both time and frequency. Thus, all CDMA signals share the same frequency spectrum. In the frequency or the time domain, the multiple access signals appear to overlap one another.

There are a number of advantages associated with CDMA communication techniques. The capacity limits of CDMA-based cellular systems are projected to be up to twenty times that of existing analog technology as a result of the properties of a wide band CDMA system, such as improved coding gain/modulation density, voice activity gating, sectorization and reuse of the same spectrum in every cell. CDMA transmission of voice by a high bit rate decoder ensures superior, realistic voice quality. CDMA also provides for variable data rates allowing many different grades of voice quality to be offered. The scrambled signal format of CDMA completely eliminates cross talk and makes it very difficult and costly to eavesdrop or track calls, ensuring greater privacy for callers and greater immunity from air time fraud.

In a "traditional" direct-sequence CDMA system, the informational data stream to be transmitted is impressed upon a much higher rate data stream known as a signature sequence to generate a transmitted sequence. The informational data stream and the high bit rate signature sequence stream are combined by effectively multiplying the two bit streams together, assuming the binary values of the two bit streams are represented by +1 or −1. The informational data stream may consist of M'ary complex symbol values instead of binary +1 or −1 values. This combination of the higher bit rate signal with the lower bit rate data stream is called coding or spreading the informational data stream signal. Each informational data stream or channel is allocated a unique signature sequence.

Typically, the signature sequence data are binary, giving rise to stream of bits referred to as "chips." One way to generate this signature sequence is with a pseudo-noise (PN) process that appears random, but can be replicated by an authorized receiver. It is common for the period of the signature sequence to occupy one data symbol period, so that each data symbol is spread by the same Nc-chip signature sequence. A randomizing code sequence with a very long period may be added on top of this. In general, this signature sequence may be represented by real and imaginary numbers, corresponding to sending a chip value on the carrier frequency (I channel) or on a 90-degree shifted version of the carrier frequency (Q channel). Also, the signature sequence may be a composite of two sequences, where one of these sequences is a Walsh-Hadamard code word.

Typically the data symbols are binary. Thus, transmission of the signature sequence or its inverse represents one bit of information. In general, to send information symbol b using signature sequence s(n), one transmits $$t(n) = b\, s(n) \qquad (1)$$

The receiver correlates the received signal with the known signature sequence to produce a detection statistic, which is used to detect b. For binary information symbols, when a large positive correlation results, a "0" is detected; when a large negative correlation results, a "1" is detected.

A plurality of coded information signals modulate a radio frequency carrier, for example by phase shift keying (PSK), and are jointly received as a composite signal at the receiver. Each of the spread signals overlaps all of the other spread signals, as well as noise-related signals, in both frequency and time. If the receiver is authorized, then the composite signal is correlated with one of the unique signature sequences, and the corresponding information signal can be isolated and decoded.

In the above example, a data symbol b directly modulates a signature sequence s(n), which is commonly referred to as coherent modulation. The data symbol can be binary (+1 or −1), quaternary (+1, +j, −1, −j), or, in general, M'ary, taking on any of M possible values. This allows $\log_2(M)$ information bits to be represented by one information symbol b. In another traditional CDMA modulation scheme, the information is contained in how b changes from one symbol to the next, this being referred to as differentially coherent modulation. In this case, the true information is usually given by b(t) b*(t-Ts), where * denotes complex conjugation, t is a time index, and Ts is the information symbol period. In yet another traditional CDMA modulation scheme, sometimes referred to as noncoherent modulation, an M'ary information symbol is conveyed by transmitting one of M different signature sequences.

Another CDMA technique, called "enhanced CDMA", also allows each transmitted sequence to represent more than one bit of information. A set of code words, typically orthogonal code words or bi-orthogonal code words, is used to code a group of information bits into a much longer code sequence or code symbol. A signature sequence is used to scramble the binary code sequence before transmission. This can be done by modulo-2 addition of the two binary sequences. At the receiver, the known scramble mask is used to descramble the received signal, which is then correlated to all possible code words. The code word with the largest correlation value indicates which code word was most likely sent, indicating which information bits were most likely sent. One common orthogonal code is the Walsh-Hadamard (WH) code. Enhanced CDMA can be viewed as a special case of noncoherent modulation.

In both traditional and enhanced CDMA, the "information bits" or "information symbols" referred to above can also be coded bits or symbols, where the code used is a block or convolutional code. One or more information bits can form a data symbol. Also, the signature sequence or scramble mask can be much longer than a single code sequence, in which case a subsequence of the signature sequence or scramble mask is added to the code sequence.

In many radio communication systems, the received signal includes two components: an I (in-phase) component and a Q (quadrature) component. This results because the transmitted signal has two components, and/or the intervening channel or lack of coherent carrier reference causes the transmitted signal to be divided into I and Q components. In a typical receiver using digital signal processing, the received I and Q component signals are sampled every Tc seconds, where Tc is the duration of a chip, and stored.

U.S. Pat. Nos. 5,151,919 and 5,218,619 to Paul W. Dent describe a CDMA system which allows several subscribers to communicate on the same radio frequency with a base station, which patents are incorporated here by reference. Unlike more traditional CDMA systems, interference is prevented in these patented systems by, for example, decoding signals successively in strength order from strongest to weakest, and subtracting the decoded signals from the received composite signal after decoding.

The exemplary implementations described in the foregoing incorporated patents use digital signal processing for descrambling a signal by use of its known scrambling code, transforming the signal to the spectral domain, and then notching out the spectral component associated with that signal. After notching, the remaining, nonzero components represent the transform of the other signals which have been descrambled with the first signal's code. The remainder is then transformed back to the waveform domain and the descrambling code re-applied to restore the signals to their original domain with one of them now subtracted.

In U.S. Pat. No. 5,218,619, it is disclosed that imperfect signal subtraction caused by errors in the amount of signal subtracted due to interference from other, weaker, overlapping signals may be eliminated by subtracting an already subtracted signal again in suitable amount, after having subtracted some of said other signals. This resubtraction process, referred to as reorthogonalization, can be performed by digital signal processors. However, this technique has the characteristic that the amount of processing increases with at least the fourth power of the spectrum bandwidth, making this technique costly for wideband signals.

SUMMARY

A different method and receiver which provide, among other features, for resubtraction of an already subtracted signal in order to eliminate subtraction errors, termed re-orthogonalization, and which can be optimized for wideband operations, are described herein. According to exemplary embodiments, pairwise combinations of spreading codes are used to despread received composite signals. For example, these pairwise combinations can include a first spreading code associated with a signal that has already been subtracted and a second spreading code associated with a signal which is weaker than that associated with the first spreading code. In this way both resubtraction and subtraction are performed at the same time. According to another exemplary embodiment, signal echos can also be subtracted by despreading using a time shifted version of the spreading code.

BRIEF DESCRIPTION OF THE DRAWINGS

The foregoing, and other, objects, features and advantages of the present invention will be more readily understood upon reading the following detailed description in conjunction with the drawings in which.

DETAILED DESCRIPTION

Figure 1:
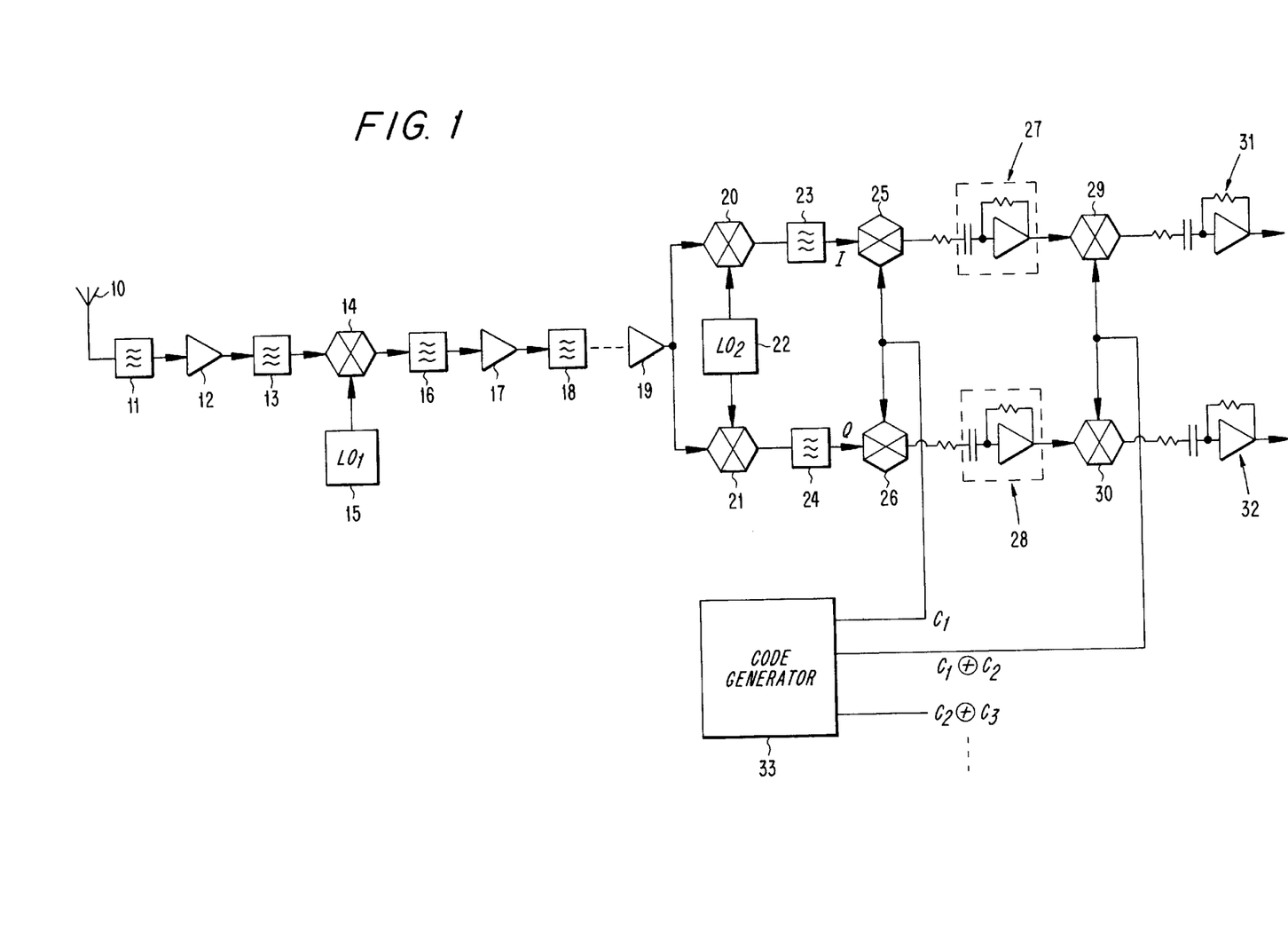
FIG. 1 is a block diagram illustrating a CDMA receiver according to an exemplary embodiment of the present invention.

FIG. 1 shows a block diagram of a subtractive CDMA receiver according to an exemplary embodiment of the present invention. An antenna 10 receives a composite of overlapping CDMA communications signals using the same radio frequency. The composite signal is filtered in filter 11 to remove out-of-band interference, amplified by low noise amplifier 12 and then filtered again using filter 13 to remove image noise. The resultant signal can then be converted to a suitable intermediate frequency by heterodyne mixing in mixer 14 with a signal from local oscillator signal 15, which can be a programmable frequency synthesizer, to select any of several CDMA channels. The intermediate frequency signal is further filtered in IF filters 16 and 18 and amplified in amplifiers 17 and 19 in order to remove signals at other CDMA channel frequencies and to raise the signal to a convenient level. It will be appreciated by those skilled in the art that the foregoing description is that of a single superheterodyne receiver. However, it should be recognized that this type of receiver is used purely as an illustration. For example, a double superheterodyne receiver employing two frequency downconversions to the final intermediate frequency could equally be used or as will be further described, a so-called homodyne receiver can be employed in which a direct conversion from the received frequency at the antenna to a baseband frequency quadrature signal takes place.

In FIG. 1, the last stage of conversion using quadrature local oscillator 22, quadrature mixers 20,21 and optional low-pass filters 23,24 is a homodyne conversion, resulting in CDMA signals I and Q. The I and Q signals represent the original composite signal but frequency-translated down to around DC or zero frequency.

A common problem with homodyne receivers is that spurious DC offset components from the quadrature mixers 20 and 21 can be much stronger than the wanted signal, hindering detection of that signal. This problem is addressed in U.S. Pat. No. 5,241,702 entitled "DC Offset Compensation" to Paul W. Dent which disclosure is incorporated here by reference. This patent utilizes differentiation of the I,Q signals to remove unwanted DC components, but may also remove wanted DC or low-frequency components of the signal. By utilizing known characteristics of what the total wanted signal waveform should look like however, the wanted components which have been unintentionally removed can be restored. This principle can be adapted to the subtractive CDMA receiver of FIG. 1 to obtain advantageous characteristics. The I,Q components of the strongest signal in the composite signal are first descrambled using the a priori information of that signal's scrambling (i.e., spreading) code. For example, this a priori information can be used to program code generator 33 to generate a replica C1 of the spreading code associated with the strongest signal. This code replica is applied to balanced mixers 25 and 26 to produce despread I,Q signals at their outputs. Spurious DC offset from homodyne downconvertors 20 and 21 now appears as a component that is spread using the strongest signal's spreading code. It will be recognized by those skilled in the art that mixers 25 and 26 can be implemented in a number of ways including, for example, diode ring mixers, transistor Gilbert cells, phase reversing switches and the like.

The DC offset from homodyne downconvertors 20 and 21 can also be prevented from producing a spurious code component from I,Q despreaders 25 and 26 by including a high pass filter element in filters 23 and 24. The high pass filter removes DC offset components but only insignificantly affects the wideband composite CDMA signal reaching despreaders 25 and 26.

The signal despread with code C1 comprises a narrow spectral component (i.e., despread signal number 1) plus the rest of the composite signal still in wideband spread form. The other signals in the composite remain spread since code C1 is not correlated to their spreading codes. In fact the second strongest signal, which was originally spread with code C2, is at this point spread with a modulo-2 combination of C1 and C2.

The first despread signal can now be extracted from the outputs of despreaders 25 and 26 and further processed to extract information. This extracted information could, for example, take the form of digital data, digitized speech, analog FM or single-sideband speech modulation. Digital signals are preferred, as they lend themselves to other advantageous processing such as error correction coding and enciphering. Single-sideband, however, has the advantage that a significant self-interference reduction is realized due to the mean power in a speech signal being much less than its peak power. In a digital speech system, this advantage is limited to a factor of about two, which is obtained by turning off the transmission of the temporarily quiet party in a two-way conversation.

The first despread signal is then removed from the outputs of despreaders 25 and 26 by high-pass filters 27 and 28. The high pass filters are tailored to suppress the narrowband despread signal in the same way as filters 23 and 24 can be tailored to suppress the homodyne offset, while leaving the remaining, non-despread signals largely unaffected. The I,Q remainder signals from filters 27 and 28 can now be respread with the code C1 prior to despreading with the code C2. Moreover, these two steps can be performed at the same time by despreading the remainder with C1+C2, which is generated by the code generator 33 using a-priori knowledge of the codes of both the first (strongest) and second (second strongest) signals as well as their relative timing. Despreading with C1+C2, where the symbol "+" here means modulo-2 (bitwise) addition, results in the second signal appearing in narrowband, despread form at the output of despreaders 29 and 30. This narrowband signal can be extracted for I,Q processing to demodulate and decode information, and can also be removed by high-pass filters 31 and 32 prior to despreading with C2+C3 and so forth until either all signals have been decoded or until a desired signal has been reached and decoded. In this way, a desired signal can lie well under the signal strength of the strongest signal and still be readable.

Two sources of subtraction imperfections can limit how far below the strongest signal a desired signal can still be read. Firstly, time-dispersion, that is delayed echos of a signal, add components that do not become despread using codes such as C1 or C2, because the echos are shifted one or more chips in time and then do not correlate perfectly their associated spreading code. The echos are then unsubtracted. To compensate for unsubtracted echos, the second stage of subtraction using code C2 can be carried out using a C2 code that is a time-shifted version of the C1 code, according to the echo delay. The second stage despreading code then appears to be C1 modulo-2 added to a delayed version of C1, namely C1(t).C1(t-T), where the symbol "." represents multiplication if chips of C1 are given the arithmetic values ±1 or modulo-2 addition if chips are given the Boolean values 1 or 0. To implement this exemplary embodiment, the first two stages of subtraction illustrated in FIG. 1 can be used to remove the first signal and its echos. The second signal would then be despread and subtracted in subsequent, similar stages.

To further process a signal despread in this way, the narrowband I,Q outputs from despreaders 25, 26, 29 and 30 can be fed to further processing circuitry (not shown) known as a RAKE combiner, where complex weighted sums are formed to decode the signal making maximum use of all the signal energy in both the direct wave and the echo. This RAKE combining process may be extended to include any number of significant delayed echoes. It is also sometimes desirable, e.g., in CDMA cellular downlink processing, to include weighted sums of despread echo components that do not exist, which of course one would not then attempt to subtract. Despreading non-existent echos with shifted codes for this purpose can be accomplished by despreader pairs (not shown) running side-by-side with a despreader pair such as pair 25 and 26 that is despreading an echo having significant energy. However, only despreader pair 25 and 26 and other despreaders that despread real echos pass signals on to filters such as filters 27 and 28, while the parallel despreader pairs (not shown) that are operating on non-existent echos pass signals on only to further processing such as the RAKE combiner described above. In addition to traditional RAKE combiners, a RAKE combiner modified according to the inventive principles of U.S. patent application Ser. No. 08/187,062 entitled "Method for Demodulation of Downlink CDMA Signals" can also be employed, which patent application is incorporated here by reference. This modification of the RAKE combining technique is appropriate for a CDMA mobile phone system application in the direction of transmission from base-to-mobile, i.e. for the mobile receiver, while conventional RAKE techniques are appropriate for the mobile-to-base direction, i.e. the base station receiver.

A second cause of imperfect subtraction is that an amount not only of the despread signal is removed, but also low frequency components of other signals, spread with, for example, C1+C2, C1+C3 . . . etc. at the output of the first despreader pair, e.g., despreaders 25 and 26. If all codes C1,C2,C3 etc. belong to a set closed with respect to the property that the modulo-2 sum of any pair comprises an equal number of 1's and 0's, then this cause of imperfect subtraction may be reduced. For example, if all codes C1,C2,C3... belong to a closed set with respect to modulo-2 addition and all have equal numbers of 1's and 0's, the requirement is fulfilled. The Walsh-Hadamard orthogonal code set is such a set but has a limited number of members. An alternative expanded set was developed by Bottomley and Dent and is disclosed in U.S. Pat. No. 5,353,352 entitled "Multiple Access Coding for Mobile Radio Communications" which patent is incorporated here by reference.

With any form of coding however, residuals of imperfect subtraction at an earlier stage may be further reduced at a later stage by re-subtraction in a manner similar to that described in U.S. Pat. No. 5,218,619. To accomplish this resubtraction in the context of the exemplary circuitry of FIG. 1, code C1 can be used again at a later despreading stage, e.g., beyond despreaders 29 and 30 and before despreading signal n with code Cn. This re-subtraction stage would actually use a despreading code $C_{n-1}$, C1 according to the aforementioned principle of combining respreading with a previous code $C_{n-1}$ and despreading by the next code. Resubtraction of signal 2 may thus be accomplished using code C2 again in the stage before using C(n+1) and the despreading code would be Cn.C2, and so on. Resubtraction of strong multipath echoes may also need to be performed in a similar manner.

The code generator 33 can be programmed with knowledge of timing from a synchronization controller (not shown) and a signal strength tracker and sorter (not shown) which are however described in the above-incorporated U.S. Pat. No. 5,218,619. It will also be appreciated that despreading a homodyne converted signal to obtain a narrowband signal around DC, which is then subtracted from the spread spectrum composite using a high pass filter is equivalent to low-pass filtering the despread result and then subtracting that result. Another analogous technique would be to despread a signal at a non-zero intermediate frequency to obtain a narrowband signal around that intermediate frequency and then to notch out the narrowband signal using a bandstop filter.

Figure 2A:
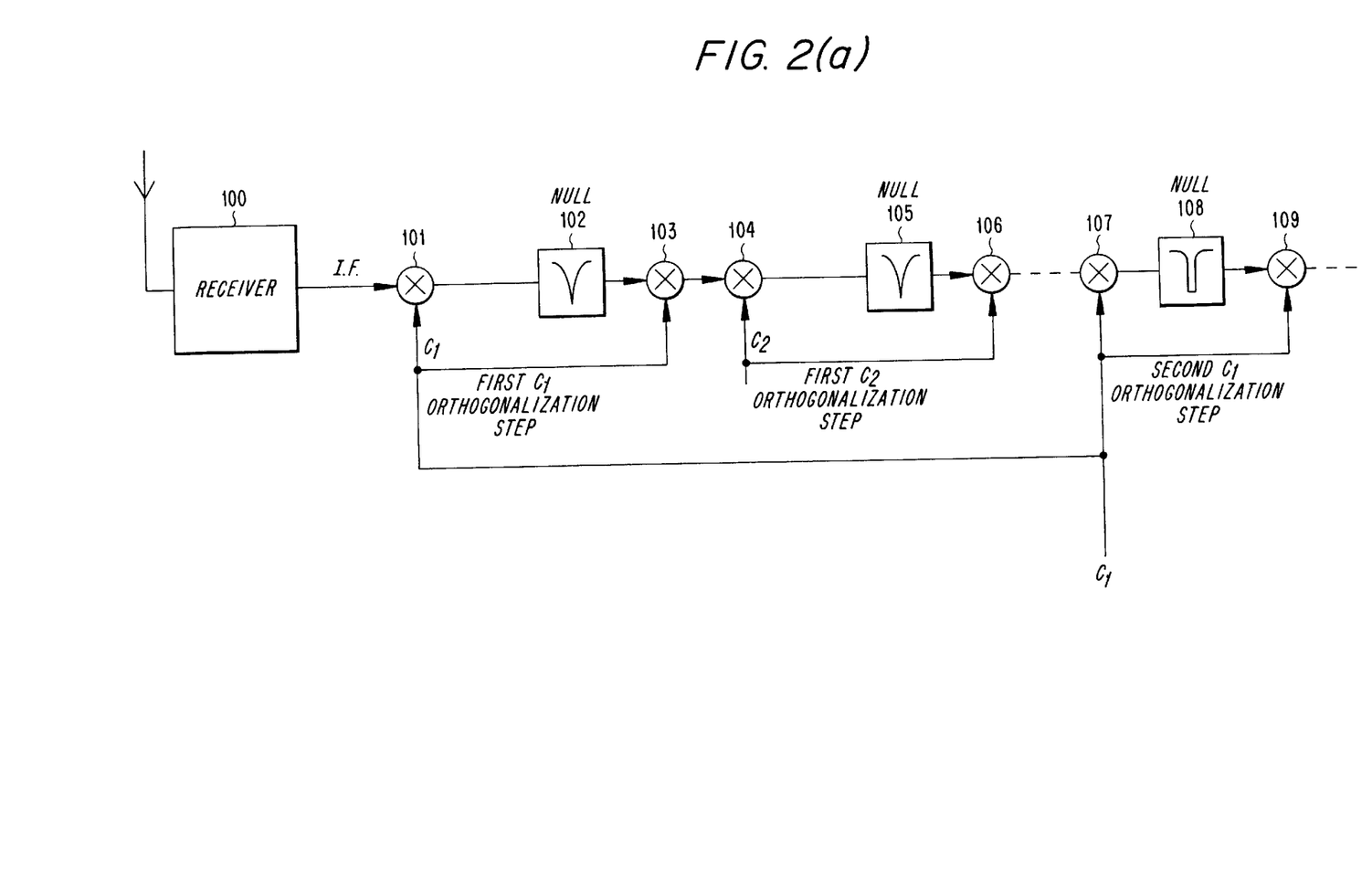
FIG. 2a is a block diagram illustrating re-orthogonalization at an intermediate frequency according to an exemplary embodiment of the present invention.

FIG. 2 illustrates the aforedescribed re-orthogonalization principle applied by way of spectral nulling. A receiver 100 downconverts the received signal, if necessary, to a suitable intermediate frequency. The intermediate frequency is then despread using the code C1 of the strongest signal in despreader 101. The narrowband, despread signal is then nulled out in the spectral domain by nulling filter 102. The residual signal is then respread with code C1 in respreader 103 prior to being despread in 104 with code C2, nulling out signal 2 in filter 105 and respreading with C2 in block 106. According to this exemplary embodiment, re-orthogonalization of the signal with respect to C1, i.e. by subtracting out again a component that correlates with C1 after having subtracted or nulled out other signals, is shown as second C1 despreader 107, second nulling filter for C1-correlated components 108 and second C1 respreader 109. After the resubtraction stage represented by blocks 107, 108 and 109, the residual signal can be further processed to extract other signals, and later resubtraction of C2 and C1 for a third time. Indeed resubtraction of any or all of previously subtracted signals may be performed to prevent accumulation of subtraction imperfections that hinder the decoding of weak signals.

Figure 2B:
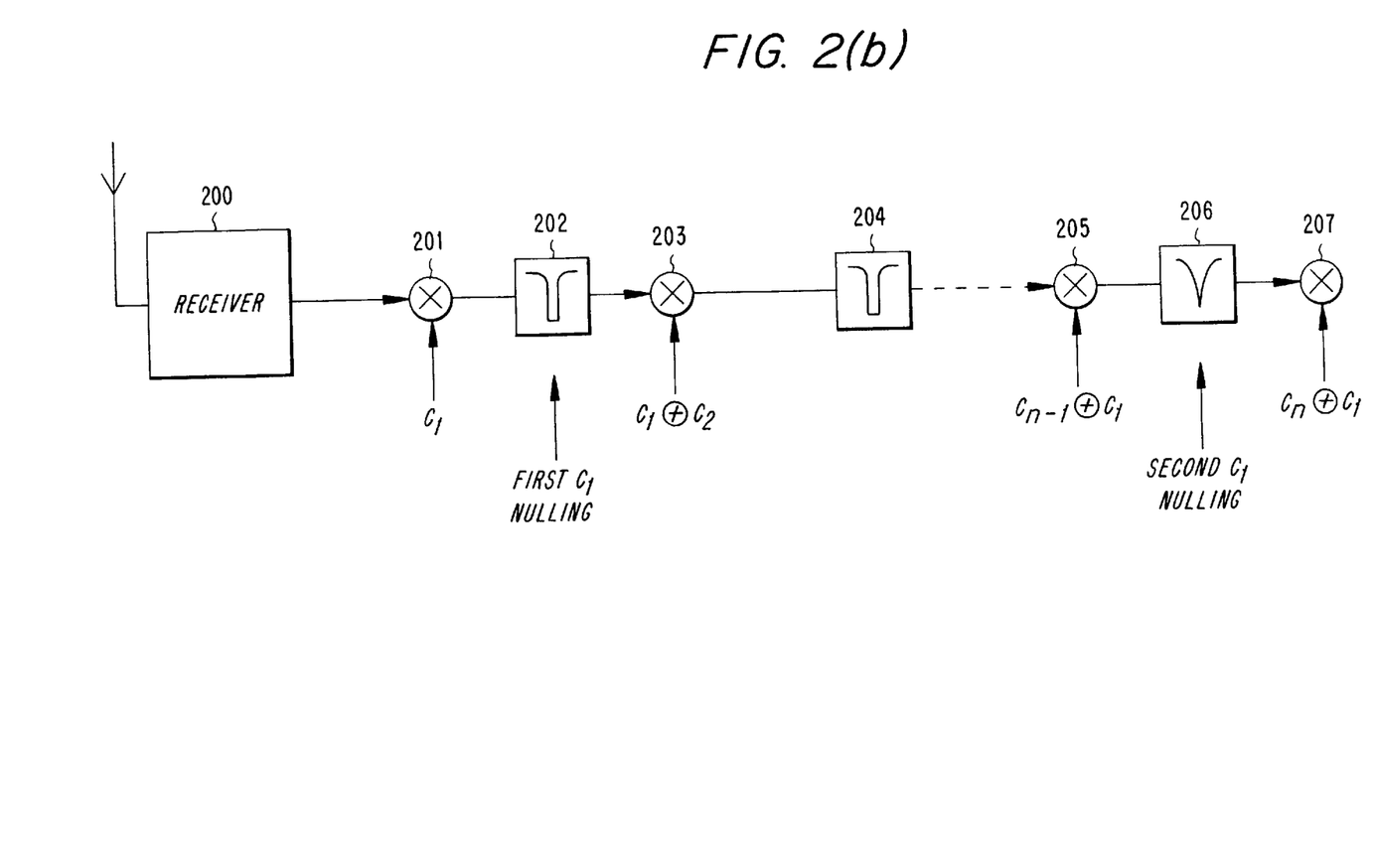
FIG. 2b is a block diagram illustrating re-orthogonalization at an intermediate frequency according to another exemplary embodiment of the present invention.

FIG. 2b shows that, according to another exemplary embodiment, the respreading stage 103 and despreading stage 104 of FIG. 2a can be combined into a single despreader 203 using a code waveform that is an arithmetic product (or a modulo-2 sum, for binary codes) of code waveforms C1 and C2. The despreaders of the resubtraction stage 205 and 206, when this combination is made, use code C1 combined with the immediately preceding code denoted by C(n-1) and C1 combined with the immediately following code, denoted by Cn, respectively.

Figure 3:
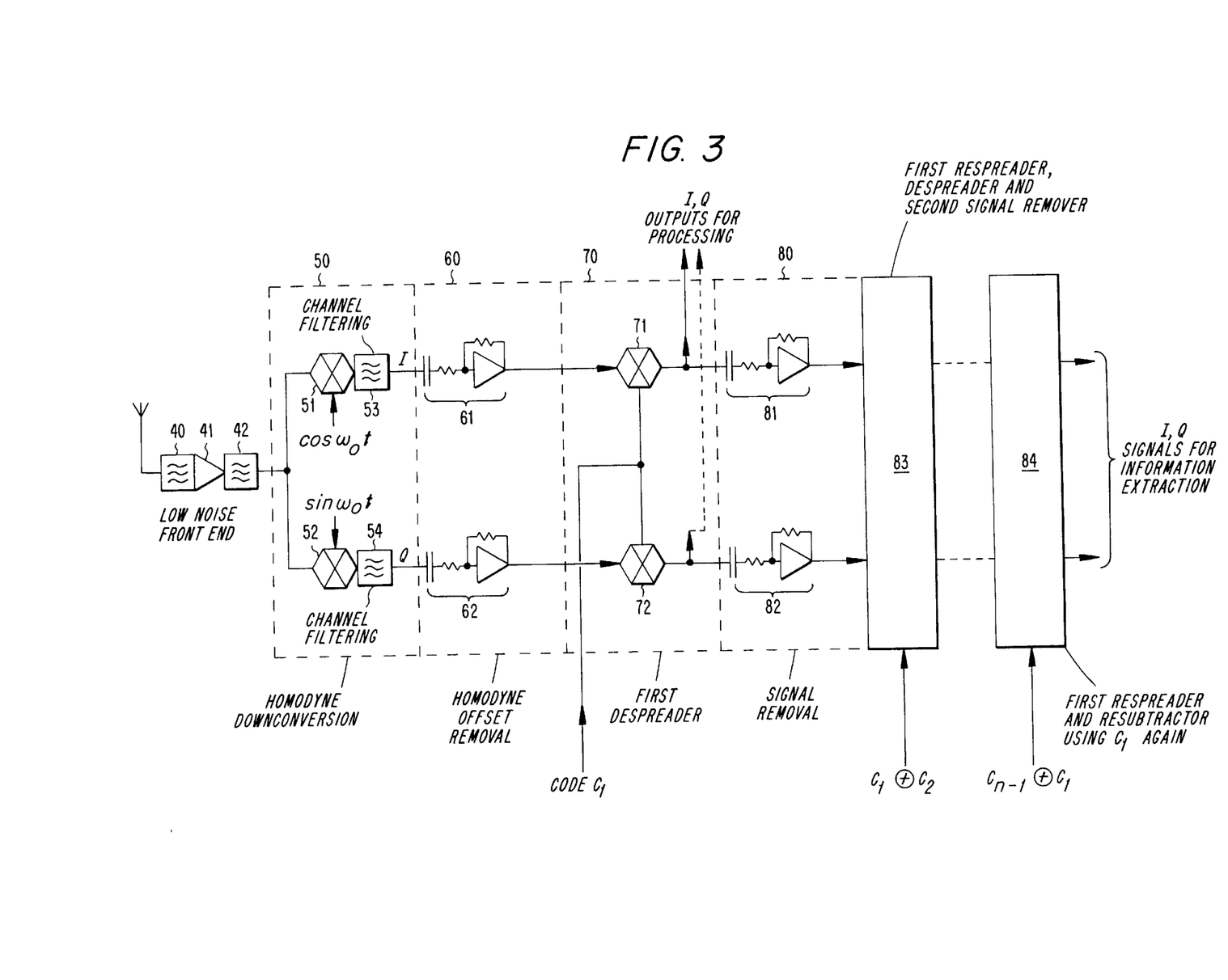
FIG. 3 is a block diagram of an exemplary high-pass filtering embodiment according to the present invention.

FIG. 3 shows an exemplary embodiment wherein the inventive resubtraction techniques are implemented using high-pass filtering of despread I,Q signals. A low noise amplifier 41 and filters 40 and 42 select and amplify the desired frequency band and apply a signal to homodyne downconvertor 50. It will be realized by persons skilled in the art that further stages of amplification, filtering and downconversion to an intermediate frequency can optionally precede the homodyne downconvertor 50. Homodyne downconvertor 50 includes quadrature mixers 51 and 52 driven by cosine and sine local oscillator waves that mix with the signal to produce complex I,Q baseband output signals. The local oscillator frequency $\omega_0$ is centered on the desired channel to be processed so that the signal is converted into I,Q baseband frequencies centered on DC. DC offset from hardware imperfections can thus interfere with wanted signal processing and is preferably removed by high pass filters 60. The high pass filters have low attenuation over most of the wide spread-spectrum signal bandwidth and this does not substantially reduce wanted signal energy.

First despreader 70 includes mixers or phase reversing switches 71 and 72 and operates to despread a first signal using code C1. The first signal despread is preferably the strongest signal. The despread signal component is compressed to a narrow bandwidth around DC which is removed by high-pass filters 81 and 82 in signal remover 80. Other signals that are not despread by code C1 are left substantially unattenuated by signal remover 80. High pass filters 81 and 82 are used in signal remover 80 when it is desired to remove a signal centered on zero, i.e., DC. In the event that some signal to be removed has a frequency offset relative to coo, it will appear after despreading as narrowband I,Q signals centered on a frequency other than DC and then filters 81 and 82 can be notch or bandstop filters.

After removal of the first signal in filter 80, the residual is respread using code C1 and despread using the code C2 of the next signal to be extracted. This can be accomplished in block 83 using structure which is similar to that of first despreader 70 but using a modulo-2 combination C1*C2 of codes C1 and C2, where the operator "*" signifies a bitwise exclusive-OR operation. Block 83 is also understood to contain filters to remove the despread C2 signal component before passing the new residual to the next stage, and so forth to final stage 84. If only a single signal is to be decoded, the cascade of stages terminates when the output signal is the desired signal with stronger interfering signals having been removed in previous stages. Each stage may optionally, however, output its despread signal component before removal, the output components being used to decode other signals such as in a cellular base station when all signals from mobile stations are desired to be decoded.

When the signal strength difference is large between the strongest signal S1 removed using code C1 and the final signal to be despread and decoded using Cn in a stage (not shown) following stage 84, residual errors caused by imperfect signal removal due to noise and multiple-user interference effects can remain, but as described in the above-incorporated U.S. Pat. No. 5,218,619, the inventor showed that residual subtraction errors from a stage using code C1 would still be correlated with the code C1 and could be more accurately identified after first subtracting other signals. Thus, according to an aspect of the present invention, the stage designated by reference numeral 84, which could in fact be any signal removal stage after 50, includes simultaneously respreading with the despreading code $C_{n-1}$ of the immediately preceding stage combined with despreading again using the code C1 in order to despread and filter out residual components correlated with C1 that were not perfectly removed in stage 50. Likewise, any residual component correlated with C2 that was not removed in stage 83 can be further reduced by including similar re-removal stages at any point in the chain after stage 83, preferably after removing further signals to allow better identification of the small residual error.

Figure 4:
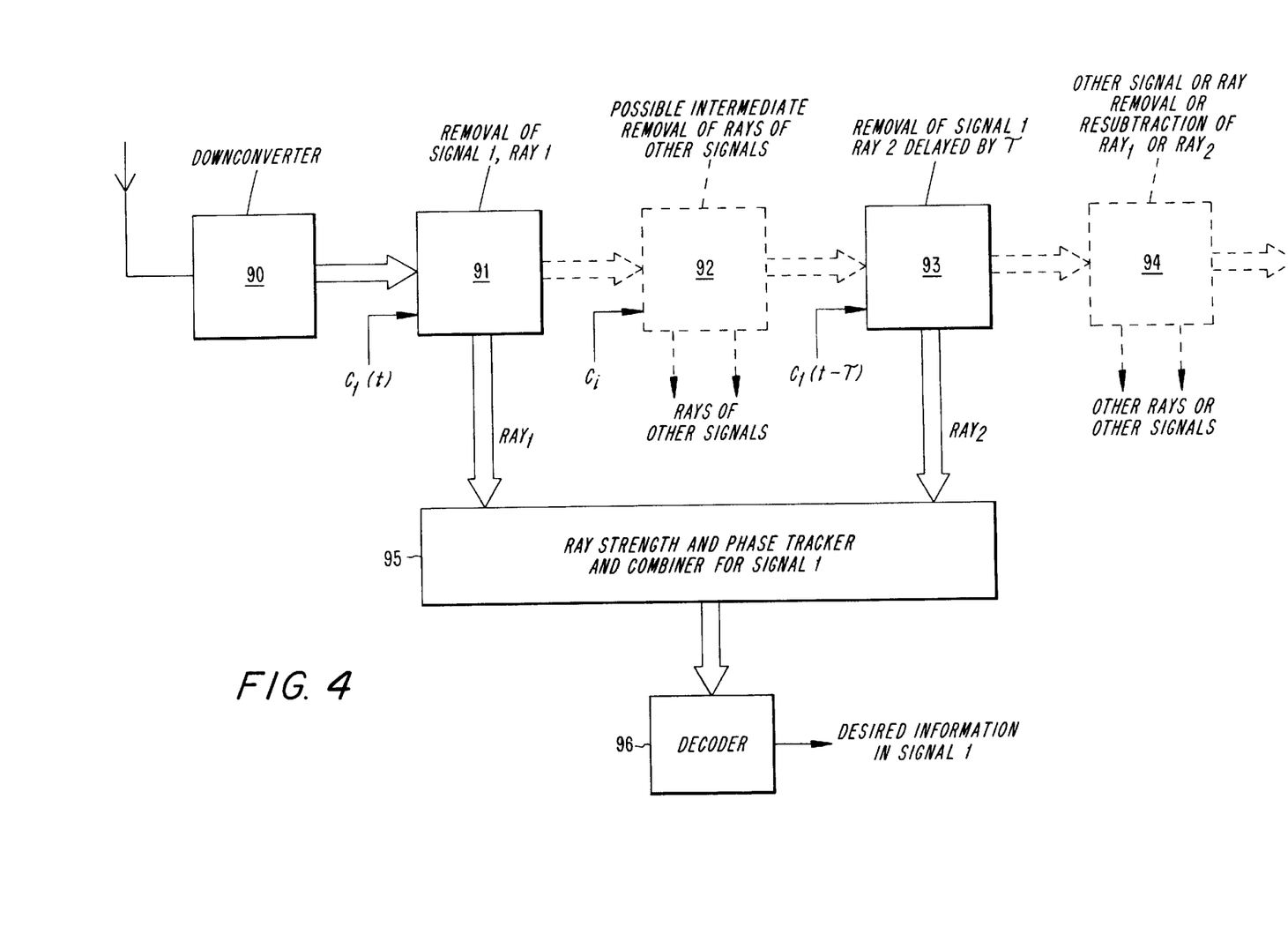
FIG. 4 is a block diagram illustrating removal of delayed signals rays according to an exemplary embodiment of the present invention.

FIG. 4 illustrates that some of the signal removal stages can be used for removal of differently-delayed rays of the same signal by using a delayed version $C1_{t-T}$ of the code sequence $C1_t$. Rays are preferably removed in descending signal strength order. For example, assuming ray 1 of signal 1 is the strongest received ray of all; then it is despread in a first stage 91 using code $C1_t$. The despread components of the rays of the same signal (e.g., signal 1 ray 1, signal 1 ray 2, etc.) may be fed to combiner 95 which may be, for example, a RAKE combiner, that tracks the phase and amplitude of every ray and performs coherent combination with the aid of complex weights to enhance the signal for decoding in decoder 96. Block 95 can alternatively be a selection combiner for selecting for decoding always the strongest ray of signal 1, which, however, should always be arranged to be that removed in stage 91 by using the appropriate code delay $C1_t$, $C1_{t-T}$, etc. in stage 1. Block 92 illustrates that rays of other signals may be despread and removed before a second ray of signal 1 is despread, which is desirable if the other signal rays are stronger than signal 1 ray 2.

Signal 1 ray 2 is despread in stage 93 by using code C1 delayed by T, i.e., the code sequence $C1_{t-T}$ where T is chosen to correspond as closely as possible to the delay of the second strongest ray of signal 1 relative to the strongest ray of signal 1. The despread ray 2 component is fed to combiner 95 before being filtered out from the signal passed to subsequent stages represented by block 94. Block 94 can proceed to despread and remove other rays of signal 1, rays of other signals, or to re-subtract components correlated with any of code $C1_t$, code $C1_{t-T}$ or any other code or delayed code used previously in an earlier signal removal stage. As shown in U.S. patent application Ser. No. 08/187, 062, to Paul Dent et al., which has been incorporated by reference above, it can be desirable to form combinations in combiner 95 including signal rays that are not received. This phenomenon arises in a mobile receiver for decoding a CDMA signal from a base station in the presence of multiple-user noise originating in the same base station. Those phantom rays that have a negative delay relative to the strongest ray or direct ray are used when the optimum receiver is a so-called "inverse channel filter approximation" and not a RAKE receiver, or a hybrid of the two when both same-base and other-base noise is to be combatted. Phantom rays do not, however, have to be subtracted as they do not constitute real interference to other signals.

Figure 5:
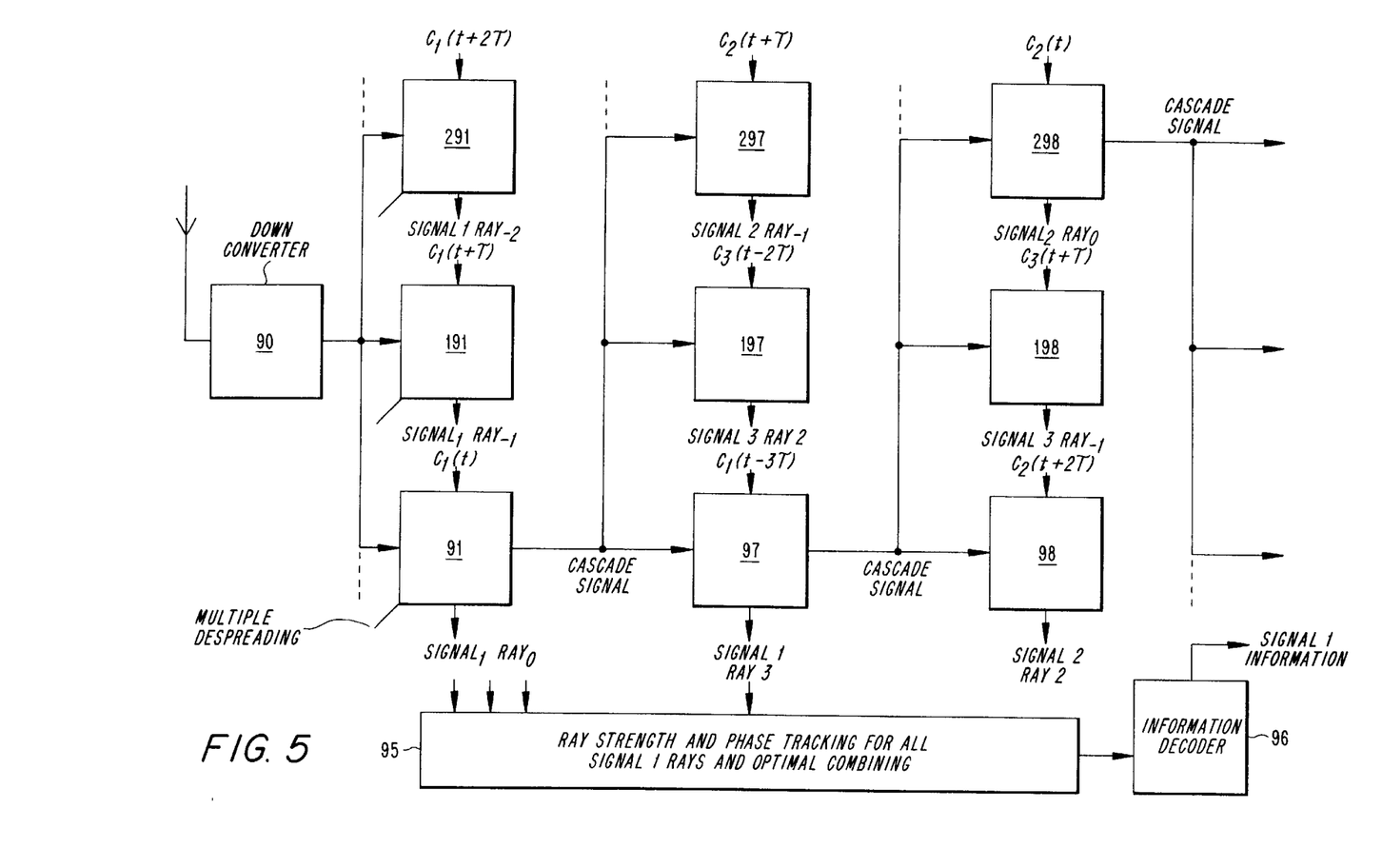
FIG. 5 is a block diagram illustrating monitoring and processing of rays according to another exemplary embodiment of the present invention.

FIG. 5 shows an exemplary system for despreading of phantom rays in despreaders 191, 291, 197, 297, 98 and 198 that do not produce a cascade output signal because they do not perform a signal removal function, only a despreading function. Despreaders 91, 97 and 298 that despread real rays, however, include removal of the despread energy and generation of a cascade for connection to the next stage. Combiner 95 combines all despread rays, real or phantom, corresponding to the same signal, for example, signal 1, to produce an enhanced ratio of wanted signal to noise-plus-interference for information decoder 96. FIG. 5 thus illustrates both parallel connected despreaders and cascade connected despreaders, those that produce the cascading signal as an output incorporating removal of despread signal energy by high-pass I,Q filtering or notch filtering at an intermediate frequency, while those that do not produce a cascade output are used to despread phantom rays or rays that are not presently sufficiently strong to warrant their removal, but which are being monitored in case they become so. It is to be understood that any signal removal stage can also constitute a re-subtraction stage for reducing residual errors left from a previous subtraction of a signal using the same code. In that case, the despread signal from a resubtraction stage is not combined in the combiner 95 for the signal decoding, which can be effected, for example, by either not connecting resubtraction stages to combiners 95 or, alternatively, giving their despread output signals zero weight in combiner 95.

Configuring the implementations of FIGS. 3, 4 or 5 such that signals or rays are subtracted in the desired signal-strength dependent order may be conveniently effected by selection of the code sequences delivered from code generator 35 to each despreading stage to correspond to the signal or ray that stage must deal with. The programming of the code generator to output different codes to different stages at different times may be accomplished by tracking the changing amplitudes of different signals and rays in combiner 95. After sorting into signal and ray-strength order, control signals can be fed from combiner 95 to adapt the code generator so that the code delivered to stage 1 (i.e., FIG. 3, block 70 or FIGS. 4 and 5, block 91) corresponds to the strongest ray and the codes delivered to following stages correspond to successively diminishing signal or ray strengths. Thus, no actual switching of signal paths is required to dynamically adapt the inventive receiver to dynamically changing signal strength conditions. The code generator 33 can be implemented using any conventional method for initially synchronizing its codes C1,C2,C3 . . . with the timing of corresponding received signals S1,S2,S3 . . . and maintaining that synchronization. Dynamically selecting the code and code delay of the code sequence delivered to each despreading stage largely accomplishes the sync maintenance operation automatically, however.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims.

What is claimed is:

1. A receiver for receiving a multiplicity of overlapping spread-spectrum signals and decoding at least one of said overlapping spread-spectrum signals comprising:

receiving means for producing I and Q quadrature baseband signals;

code generator means for providing replicas of spreading codes used by said overlapping signals;

I and Q signal despreading means for combining said I and Q quadrature baseband signals with a first of said spreading code replicas to generate I and Q despread signals; and filtering means for removing signal energy of a first of said overlapping spread-spectrum signals spread with said first spreading code replica from said I and Q despread signals to leave first residual I and Q signals in which a total energy associated with others of said overlapping spread-spectrum signals remains substantially unaffected;

wherein said filtering means is a high-pass filter.

2. The receiver according to claim 1 further comprising:

means for despreading and removing a second of said overlapping spread spectrum signals from said first I and Q residual signals to leave second residual I and Q signals.

3. The receiver according to claim 2 wherein:

said means for despreading and removing uses a combination of said first spreading code replica and a second spreading code replica generated by said code generator means.

4. The receiver according to claim 1 in which said first spreading code replica is associated with a strongest one of said overlapping spread-spectrum signals.

5. The receiver according to claim 4 in which said strongest one of said overlapping spread spectrum signals is one of a pilot signal, a calling channel signal or a signalling channel signal.

6. The receiver according to claim 2 in which said first and second of said overlapping signals are despread and removed in signal strength order.

7. The receiver according to claim 2 in which said second residual signal is further processed to remove signal energy associated with other spreading codes to produce a final output signal.

8. The receiver according to claim 2 in which said second residual is further processed to extract desired information.

9. The receiver according to claim 8 in which said desired information is a telephone speech signal.

10. The receiver according to claim 8 in which said processing comprises demodulation of error-correction decoding and speech decoding from a low-bitrate form to a PCM form.

11. The receiver according to claim 10 in which said PCM form is transmitted to a telephone switching system over trunk lines.

12. The receiver according to claim 10 in which said PCM form is further processed using a digital-to-analog convertor to drive a telephone earpiece.

13. A receiver for receiving a multiplicity of overlapping spread-spectrum signals and decoding at least one of said overlapping spread-spectrum signals comprising:

receiving means for producing I and Q quadrature baseband signals;

high-pass filtering means for removing unwanted DC offsets from said I and Q quadrature baseband signals;

code generator means to provide replicas of spreading codes used by said overlapping signals;

I and Q signal despreading means for combining said quadrature baseband signals with a first of said spreading code replicas to obtain despread I and Q signals; and filtering means for removing signal energy associated with a first of said overlapping spread-spectrum signals spread with a first spreading code from said despread signals to leave first residual I and Q signals in which a total energy associated with others of said overlapping spread-spectrum signals remains substantially unaffected;

wherein said filtering means is a high-pass filter.

14. The receiver according to claim 13 further comprising:

means for despreading and removing a second of said overlapping spread-spectrum signals to leave second residual I and Q signals.

15. The receiver according to claim 14 in which said means for despreading and removing uses a combination of said first code replica and a second code replica generated by said code generator means.

16. The receiver according to claim 13 in which said first spreading code replica is associated with a strongest of said overlapping spread spectrum signals.

17. The receiver according to claim 16 in which said strongest signal is one of a pilot signal, a calling channel signal or a signalling channel signal.

18. A receiver according to claim 14 in which said first and second of said overlapping signals are despread and removed in signal strength order.

19. A receiver for receiving a multiplicity of overlapping spread-spectrum signals and decoding at least one of said overlapping spread spectrum signals comprising:

receiving means for producing an intermediate frequency signal;

code generator means to provide replicas of despreading codes associated with said overlapping signals and combinations thereof;

first despreading means for despreading said intermediate frequency signal with a first of said despreading code replicas to obtain a despread signal;

first filtering means for removing signal energy of a first of said overlapping spread-spectrum signals spread with said first despreading code from said despread signals to leave a residual signal in which a total energy associated with other signals remains substantially unaffected; and second despreading means for despreading said residual signal using a combination of said first despreading code replica and a second despreading code replica to obtain an output signal.

20. The receiver according to claim 19 in which said output signal is further processed to extract desired information.

21. The receiver according to claim 20 in which said desired information is a telephone speech signal.

22. The receiver according to claim 19 in which said output signal is further filtered to remove signal energy associated with said second despreading code replica.

23. A receiver for receiving a multiplicity of overlapping spread-spectrum signals and decoding at least one of said overlapping spread-spectrum signals comprising:

receiving means for producing an intermediate frequency signal;

code generator means for providing replicas of spreading codes used by said overlapping signals;

despreading means for despreading said intermediate frequency signal with a first of said spreading code replicas to obtain a despread signal;

filtering means for removing signal energy of a first of said overlapping spread-spectrum signals spread with said first spreading code from said despread signals to leave a first residual signal in which a total energy associated with others of said overlapping spread-spectrum signals remains substantially unaffected;

respreading means for respreading said first residual signal using said first spreading code-replica to obtain a first respread signal;

additional despreading, filtering and respreading means using other of said code replicas for removing energy associated with other signals from said first residual signal to obtain a second residual signal; and resubtraction means comprising despreading, filtering and respreading means using said first spreading code replica to remove from said second residual signal energy associated with said first signal to produce an output signal.

24. The receiver according to claim 23 in which said output signal is further processed to remove signal energy associated with other spreading codes to produce a final output signal.

25. The receiver according to claim 24 in which said output signal is further processed to extract desired information.

26. The receiver according to claim 25 in which said desired information is a telephone speech signal.

27. The receiver according to claim 25 in which said processing comprises demodulation or error-correction decoding and speech decoding from a low-bitrate form to a PCM form.

28. The receiver according to claim 27 in which said PCM form is transmitted to a telephone switching system over trunk lines.

29. The receiver according to claim 27 in which said PCM form is further processed using a digital-to-analog convertor to drive a telephone earpiece.

30. A receiver for receiving a multiplicity of overlapping spread-spectrum signals and decoding at least one of said overlapping spread-spectrum signals comprising:

receiving means for producing an intermediate frequency signal;

code generator means for providing replicas of spreading codes used by said overlapping signals and pairwise combinations thereof;

despreading means for despreading said intermediate frequency signal with a first of said spreading code replicas to obtain a despread signal;

filtering means for removing signal energy of a signal spread with said first despreading code from said despread signals to leave a first residual signal in which a total energy associated with other signals remains substantially unaffected;

additional despreading and filtering means using said pairwise code combinations for removing energy associated with other signals from said first residual signal to obtain a second residual signal; and resubtraction means comprising despreading and filtering means using said pairwise code combinations including said first despreading code to remove from said second residual signal energy associated with said first signal to produce an output signal.

31. The receiver according to claim 30 in which said output signal is further processed to remove signal energy associated with other spreading codes to produce a final output signal.

32. The receiver according to claim 31 in which said output signal is further processed to extract desired information.

33. The receiver according to claim 32 in which said desired information is a telephone speech signal.

34. The receiver according to claim 32 in which said processing comprises demodulation or error-correction decoding and speech decoding from a low-bitrate form to a PCM form.

35. The receiver according to claim 34 in which said PCM form is transmitted to a telephone switching system over trunk lines.

36. A receiver according to claim 34 in which said PCM form is further processed using a digital-to-analog convertor to drive a telephone earpiece.

37. A receiver for receiving a multiplicity of overlapping spread-spectrum signals and decoding at least one of said signals, comprising:

receiving means for receiving said overlapping signals and quadrature downconverting said overlapping signals to produce complex baseband I and Q signals;

code generator means for producing replicas of spreading codes used by said overlapping signals;

I and Q despreading means for despreading said I and Q signals using a replica of a first spreading code to produce first despread I and Q signals;

first filtering means for removing energy from said first despread I and Q signals associated with a first signal using said first spreading code while leaving substantially unaltered energy associated with other codes to produce first residual I and Q signals;

respreading and despreading means for respreading said first residual signals using said first spreading code replica and for despreading said first residual signals using a second code replica to produce second despread I and Q signals;

second filtering means for removing from said second despread I and Q signals energy associated with a second signal using said second spreading code to leave second residual I and Q signals;

signal removal means for removing from said second residual signals energy associated with signals using spreading codes other than said second spreading code to produce third residual I and Q signals; and resubtraction means for removing from said third residual signals remaining energy associated with said first signal using said first spreading code.

38. The receiver according to claim 37 in which said receiving means further comprises offset compensation means for removing DC offset from said complex baseband I and Q signals.

39. The receiver of claim 38 in which said offset compensation means is a high-pass filter.

40. The receiver of claim 37 in which said first filtering means is a high-pass filter.

41. The receiver of claim 37 in which said second filtering means is a high-pass filter.

42. The receiver according to claim 37 in which said respreading and despreading means comprises circuitry for forming a modulo-2 sum of said first and second spreading code replicas in said code generator to form a combined code and mixing said combined code with said first I and Q residual signals using an I-mixer and a Q-mixer.

43. The receiver of claim 37 in which said resubtraction means comprises:
   second respreading and despreading means for respreading said third residual I and Q signal using a replica of a code used by a signal last removed in said signal removal means and for despreading said third residual signals using said first spreading code replica to produce fourth residual I and Q signals; and
   third filtering means to remove from said fourth residual I and Q signals remaining energy associated with the first signal using said first spreading code to produce fifth residual I and Q signals.

44. The receiver according to claim 37 in which said first despread I and Q signals are further processed to extract desired information.

45. The receiver of claim 44 in which said desired information is a phase reference signal and said first despreading code is used by a pilot or phase reference signal.

46. The receiver of claim 44 in which said desired information is broadcast information.

47. The receiver of claim 44 in which said desired information is call alert information addressed to a mobile telephone number.

48. The receiver according to claim 37 in which said first despread I and Q signals are further processed to extract desired information carried by a first spread spectrum signal and said second despread I and Q signals are processed to extract desired information carried by a second spread spectrum signal and any subsequent despread I,Q signals obtained during operation of said signal removal means or after operation of said resubtraction means are processed to extract other desired information carried by other spread spectrum signals.

49. The receiver of claim 37 in which said first signal is the strongest of said overlapping signals and subsequently despread and removed signals are processed in descending order of signal strength.

50. A receiver for receiving a multiplicity of overlapping spread-spectrum signals and decoding at least one of said signals, comprising:
   receiving means for receiving said overlapping signals and quadrature downconverting said overlapping signals to produce complex baseband I and Q signals;
   code generator means for producing replicas of the spreading codes used by said overlapping signals and time-shifted replicas of said spreading codes;
   I and Q despreading means for despreading said I and Q signals using a replica of a first spreading code to produce first despread I and Q signals;
   first filtering means for removing energy from said first despread I and Q signals associated with a first signal using said first spreading code while leaving substantially unaltered energy associated with other of said spreading codes to produce first residual I and Q signals;
   first respreading and despreading means for respreading said first residual signals using said first spreading code replica and for despreading said first residual signals using a timeshifted replica of said first spreading code to produce second despread I and Q signals;
   second filtering means for removing from said second despread I and Q signals energy associated with an echo of said first signal to produce second residual I and Q signals;
   second respreading and despreading means for respreading said second residual signals using said timeshifted replica of said first code and for despreading said second residual signals using a second code replica to produce third despread I and Q signals; and
   processing means for processing said third despread signals to extract desired information carried by a second signal using said second spreading code.

51. A receiver according to claim 50 in which said first despread signal and said second despread signals are jointly processed to extract desired information carried by said first signal using said first spreading code.

52. A receiver according to claim 50 in which said processing means includes despreading and processing delayed echos of said second signal using said timeshifted replicas of said second code.

53. A receiver for receiving a multiplicity of overlapping spread-spectrum signals and decoding at least one of said signals, comprising:
   receiving means for receiving said overlapping signals and converting to an intermediate frequency signal;
   code generator means for producing replicas of spreading codes used by said overlapping signals and time-shifted replicas of said spreading codes;
   despreading means for despreading said intermediate frequency signal using a replica of a first spreading code to produce a first despread signal;
   notch filtering means for removing energy from said first despread signal associated with a first signal using said first spreading code while leaving substantially unaltered energy associated with other codes to produce a first residual signal;
   first respreading and despreading means for respreading said first residual signal using said first spreading code replica and to despread using a timeshifted replica of said first spreading code to produce a second despread signal;
   second filtering means to remove from said second despread signal energy associated with a delayed echo of said first signal to leave a second residual signal;
   second respreading and despreading means to respread said second residual signal suing said timeshifted replica of said first code and to despread using a second code replica to produce a third despread signal; and
   processing means to process said third despread signal to extract desired information carried by a second signal using said second spreading code.

54. A receiver according to claim 53 in which said first despread signal and said second despread signal are jointly processed to extract desired information carried by said first signal using said first spreading code.

55. A receiver for receiving a multiplicity of overlapping spread-spectrum signals and decoding at least one of said signals, comprising:
   receiving means for receiving said overlapping signals and quadrature downconverting said overlapping signals to produce complex baseband I and Q signals;
   code generator means for producing time-shifted replicas of the spreading codes used by said overlapping signals;
   first I and Q despreading means for despreading said I and Q signals using a first time-shifted replica of a first spreading code to produce first despread I and Q signals;
   second I and Q despreading means for despreading I and Q signals using a second time-shifted replica of said first spreading code to produce second despread I and Q signals;

processing means to jointly process said first and second despread signals to extract desired information;

filtering means to remove energy from said first despread I and Q signals associated with a first signal using said first spreading code while leaving substantially unaltered energy associated with other codes to produce first residual I,Q signals;

respreading and despreading means for respreading said first residual signals using said first time-shifted replica of said first code and for despreading said first residuals using a replica of a second code to produce third despread I and Q signals; and processing means to process said third despread signals to extract desired information carried by a signal using said second spreading code.

56. The receiver of claim 55 in which said first I and Q despreading means despreads the strongest ray of said first signal.

57. A receiver for receiving a multiplicity of overlapping spread-spectrum signals and decoding at least one of said signals, comprising:

receiving means for receiving said overlapping signals and converting said overlapping signals to an intermediate frequency signal;

code generator means for producing time-shifted replicas of the spreading codes used by said overlapping signals;

first despreading means for despreading said intermediate frequency signal using a first time-shifted replica of a first spreading code to produce a first despread signal;

second despreading means for despreading said intermediate frequency signal using a second time-shifted replica of said first spreading code to produce a second despread signal;

processing means to jointly process said first and second despread signal to extract desired information;

filtering means for removing energy from said first despread signal associated with a first signal using said first spreading code while leaving substantially unaltered energy associated with other codes to produce a first residual signal;

respreading and despreading means for respreading said first residual signal using said first time-shifted replica of said first code and for respreading using a replica of a second code to produce a third despread signal; and processing means to process said third despread signal to extract desired information carried by a signal using said second spreading code.

58. The receiver of claim 57 in which said first despreading means despreads the strongest ray of said first signal.

59. A receiver for receiving a multiplicity of overlapping spread-spectrum signals and decoding at least one of said signals, comprising:

receiving means for receiving said overlapping signals and producing a downconverted signal for processing;

code generator means for producing replicas of spreading codes used by said overlapping signals and time-shifted replicas of said spreading codes which are delayed by one or more code symbol periods;

despreading means for despreading said downconverted signal using different time-shifted replicas of a first spreading code and producing corresponding first despread signals at least one of which forms a cascade signal output to a second despreading means; and at least one processing means connected to jointly process said first despread signals that have been despread using timeshifted replicas of the first spreading code in order to extract desired information carried by a first signal using that spreading code.

60. The receiver of claim 59, wherein said despreading means includes respreading means to produce a cascade output for cascade connection and wherein said receiver further comprises:

additional despreading stages each stage being cascade connected to a cascade output of an immediately preceding stage to produce successive multiple despread signals from each cascaded stage using time-shifted replicas of spreading codes, each cascaded stage including filtering means for removing energy associated with a despread signal ray and respreading means to produce the cascade output for input to the next stage.

61. The receiver of claim 60 in which said cascade-connected stages remove signal energy associated with received signal rays in descending order of received signal ray strength.

62. The receiver of claim 59, wherein said despreading means further comprises:

filtering means to remove energy from one of said first despread signals corresponding to a received ray of a signal spread using said first spreading code while leaving energy corresponding to other signals or rays substantially unaltered.

63. The receiver of claim 60 in which said additional despreading means for despreading signals corresponding to echos which are being received at less than a predetermined strength to monitor for echos having significant strength.

64. The receiver of claim 60 in which said additional despreading means includes means for despreading signals corresponding to echos which are being received at less than a predetermined strength in order to provide despread signals to said at least one processing means for compensation of correlated interference on echos of said desired signal.

65. The receiver of claim 60 in which at least one of said cascade-connected despreading means removes residual energy associated with a signal ray using the same time-shift of the same spreading code as used in a preceding stage.

* * * * *